United States Patent [19]

Garvey et al.

[11] 4,169,574
[45] Oct. 2, 1979

[54] VEHICLE SEAT MOUNTING ARRANGEMENT

[75] Inventors: Louis P. Garvey, West Bloomfield; John G. Bobak, Mt. Clemens; Robert A. Maye, Warren, all of Mich.

[73] Assignee: General Motors Corporation, Detroit, Mich.

[21] Appl. No.: 880,450

[22] Filed: Feb. 23, 1978

[51] Int. Cl.² ............................................. B60N 1/02
[52] U.S. Cl. .................................... 248/429; 297/344; 296/65 R
[58] Field of Search ............... 297/344, 341; 248/429, 248/450, 393–395; 296/65 R

[56] References Cited

U.S. PATENT DOCUMENTS

| 2,826,241 | 3/1958 | Himka | 296/65 R |
| 3,189,314 | 6/1965 | Pickles | 297/344 X |
| 3,368,840 | 2/1968 | Dangauthier | 296/65 R |
| 3,653,713 | 4/1972 | Reason et al. | 297/243 |

FOREIGN PATENT DOCUMENTS 1094483  12/1954  France ..................................... 297/344

*Primary Examiner*—Francis K. Zugel
*Attorney, Agent, or Firm*—Charles E. Leahy

[57] ABSTRACT

A longitudinally extending track assembly connects the inboard side of the seat bottom frame to the vehicle body for fore and aft adjusting longitudinal movement and supports the seat bottom frame at at least two longitudinally spaced points to support the seat bottom frame against forward and rearward pitching movement. A longitudinally extending outboard track member is mounted on the vehicle body adjacent the outboard side of the seat bottom frame. A one-point track engaging means carried by the seat bottom frame is slidably interengaged in the track member to support the outboard side of the seat bottom frame for fore and aft sliding movement. The one-point track engaging means is located forwardly of the rearward portion of the seat bottom frame so that the outboard side of the seat bottom frame is cantilevered rearwardly of the outboard track member when the seat is adjusted full rearwardly and is spaced above the vehicle body floor. This one-point support on the outboard side of the seat bottom frame minimizes obstruction of the door opening to facilitate passenger entry to the rear seat and maximizes unobstructed rear seat passenger foot space beneath the outboard side of the seat bottom frame.

4 Claims, 5 Drawing Figures

VEHICLE SEAT MOUNTING ARRANGEMENT

The invention relates to a mounting arrangement for a vehicle seat and more particularly provides a three-point mounting support for a fore and aft adjustable vehicle seat.

It is well known to mount a vehicle seat on the vehicle floor for fore and aft adjustment movement. Such fore and aft adjustment of the seat is normally provided by an outboard track assembly mounting the outboard side of a seat bottom frame and an inboard track assembly mounting the inboard side of the seat bottom frame. The track assemblies are conventionally comprised of a first elongated track member mounted on the vehicle floor and a second elongated track member attached to the seat bottom frame. The first and second track members are slidably interengaged or have low friction balls located therebetween so that the track member attached to the seat bottom frame can slide fore and aft on the floor mounted track member to adjust longitudinal position on the seat in the vehicle. Both the inboard and outboard track assemblies support the seat bottom frame against forward and rearward pitching movement. A latch mechanism is associated with at least one of the track assemblies to lock the seat bottom frame at a selected position relative the vehicle floor.

Accordingly, one object, feature and advantage of the invention resides in the provision of a three-point mounting arrangement for a vehicle seat to facilitate rear seat passenger entry by minimizing obstruction of the door opening and maximizing unobstructed rear seat passenger foot space beneath the outboard side of the seat bottom frame.

A further object, feature and advantage of the invention resides in the provision of a longitudinally extending track assembly mounting the inboard side of the seat cushion frame for fore and aft adjusting movement and against rearward pitching movement while the outboard side of the seat bottom frame is supported at a single point within a body mounted outboard track member.

A further object, feature and advantage of the invention resides in the provision of a one-point track engaging means located forwardly of the rearward portion of a seat bottom frame and slidably interengaged in a track member so that the outboard side of the seat bottom frame is cantilevered rearwardly of the track member when the seat is adjusted full rearwardly to facilitate passenger entry to the rear seat and maximize passenger foot space beneath the seat bottom frame.

These and other features, objects and advantages of the invention will become apparent upon consideration of the specification and the appended drawings in which.

Figure 1:
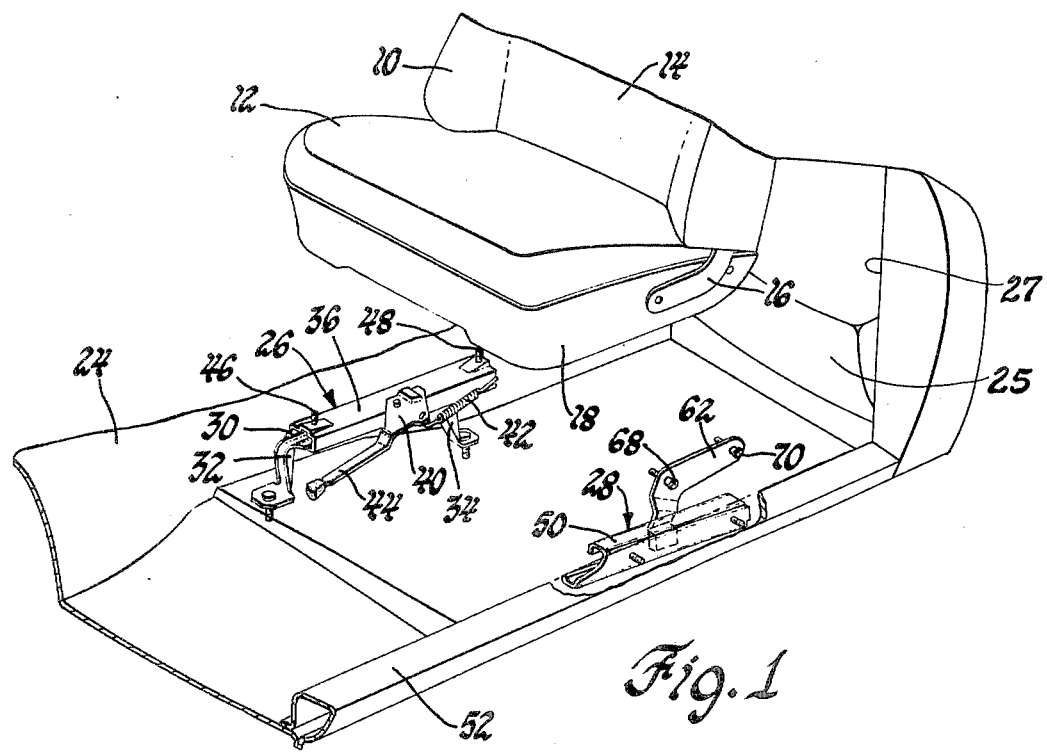
FIG. 1 is a perspective fragmentary view of a vehicle body passenger compartment showing the vehicle seat and the three-point mounting arrangement therefor.

Referring to FIG. 1, a conventional vehicle seat 10 includes a seat bottom 12 and a seat back 14. The seat back 14 includes a J-shaped outboard pivot arm 16 which extends downwardly therefrom and has its forward end pivoted to a seat bottom frame concealed beneath a trim panel 18 as will be described hereinafter so that the seat back may be pivoted forwardly for access to the rear seat 25. The seat 10 is mounted on the phantom-line indicated floor pan 24 of the vehicle body by an inboard track assembly 26 and an outboard track assembly 28. The seat 10 as well as rear seat 25 mounted on the floor pan 24 behind the seat 10 are accessible through a door opening 27.

The inboard track assembly 26 includes a lower track member 30 having a forward leg 32 and a rearward leg 34 which are bolted to the floor pan 24 and support the lower track member 30 above the floor pan 24. A channel shaped upper track member 36 slidably engages the lower track member 30, preferably through the intermediary of a plurality of bearing balls interposed therebetween to provide low friction fore and aft movement of the upper track member 34 relative the lower track member 30. A latch member 40 is pivoted to the upper track member 36 and has a latch tooth which extends through an opening in the upper track 36 to engage longitudinally spaced teeth in the lower track member 30. A latch spring 42 acts between the upper track member 36 and the latch member 40 to normally position the latch tooth of the latch member 40 in engagement with the teeth of the lower track member 30 and thereby lock the upper track member 36 against longitudinal movement. The latch member 40 has a handle 44 by which the latch member 40 may be pivoted against the bias of spring 42 to disengage the latch tooth and thereby permit longitudinal fore and aft adjusting movement of the upper track member 36. The upper track member 36 has bolts 46 and 48 which attach the seat bottom frame to the track member 36.

Figure 2:
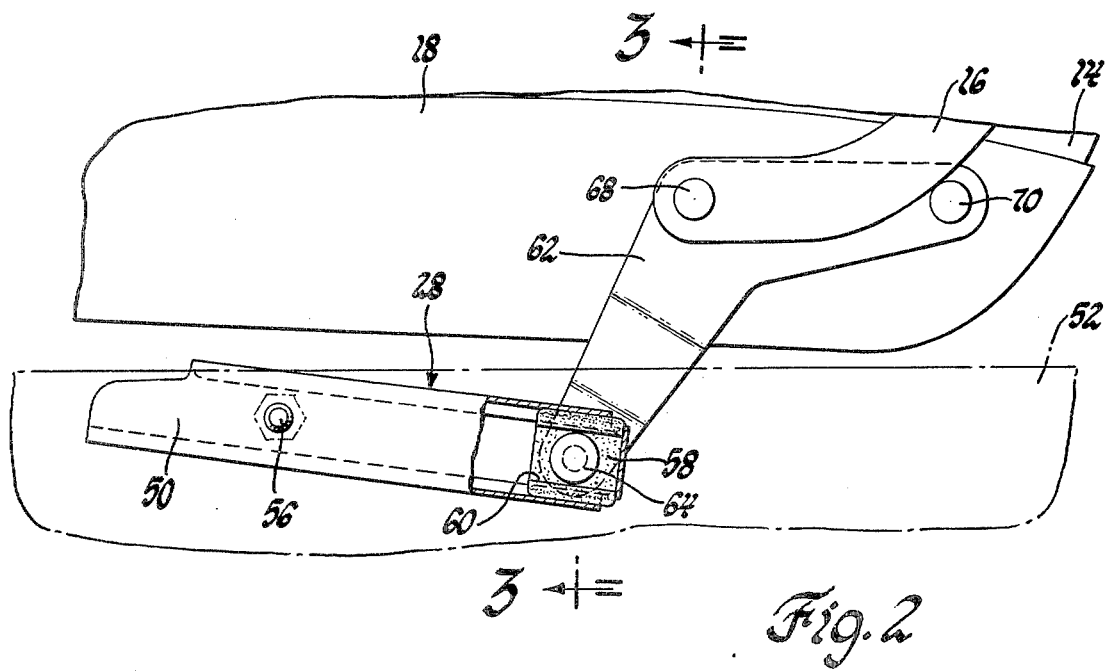
FIG. 2 is a elevation view at the outboard side of a first embodiment of the seat mounting arrangement.
Figure 3:
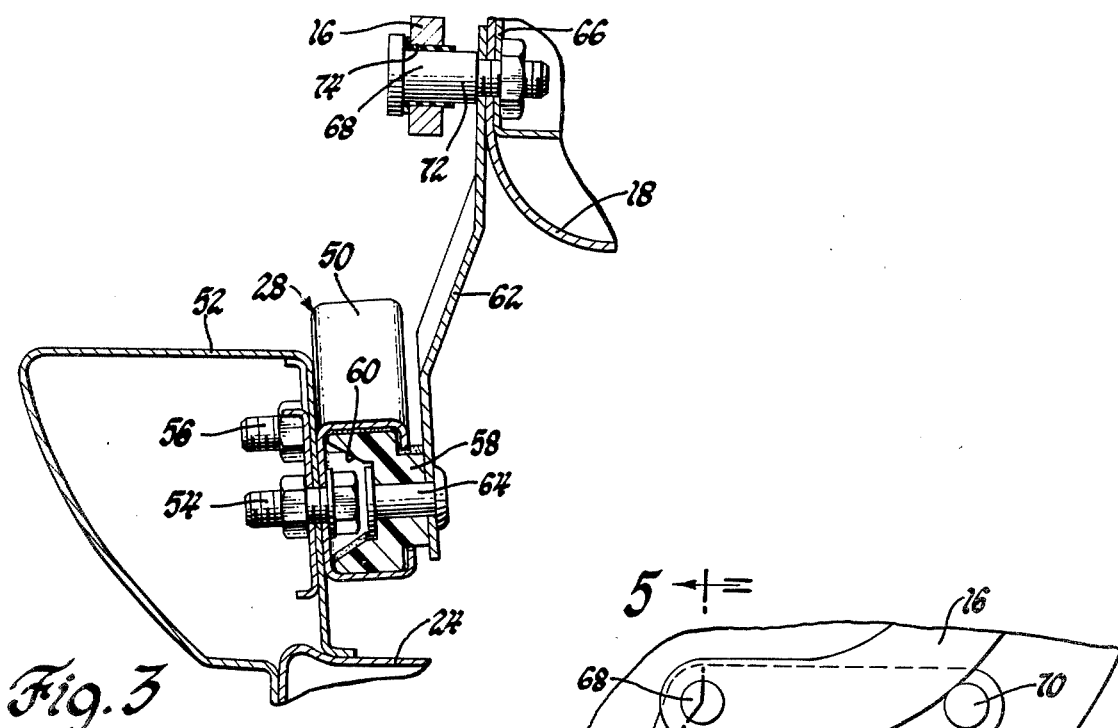
FIG. 3 is a sectional view taken in the direction of arrows 3—3 of FIG. 2.

Referring to FIGS. 2 and 3, it is seen that the outboard track assembly 28 includes a channel shaped track member 50 which is attached to the body sill 52 by a pair of longitudinally spaced bolt and nut assemblies 54 and 56. A plastic or similar low friction material slide member 58 is captured within the track member 50 for fore and aft sliding movement therein. The slide member 58 has a recess 60 facing toward the body sill 52 to allow passage of the slide member 58 over the heads of the nut and bolt assemblies 54 and 56.

An L-shaped seat bottom mounting arm 62 has a depending leg attached to the slide member 58 by a rivet 64. The other leg of the L-shaped mounting arm 62 is attached to the seat bottom frame 66 by a forward bolt assembly 68 and a rearward bolt assembly 70. As best seen in FIG. 3, the bolt assembly 68 has a shoulder portion 72 which carries a bushing 74 for pivotally supporting the seat back pivot arm 16. As seen in FIG. 2, the rearward mounting bolt 70 is engaged by the seat back pivot arm 16 to define the normal upright seating position of the seat back 14.

As seen by reference to FIGS. 1, 2 and 3, the mounting arm 62 supports the seat bottom 12 above the floor pan 24 and cantilevers the seat bottom 12 rearwardly from the rearward end of the track member 50 when the seat is positioned in the full rearward location of FIG. 2. Accordingly, the outboard track assembly 28 and mounting arm 62 mount the outboard side of the seat bottom at a single point and cooperate to minimize obstruction of the door opening 27 to facilitate passenger entry to the rear seat 25 and maximize unobstructed rear seat passenger foot space beneath the outboard side of the seat bottom frame.

Figure 4:
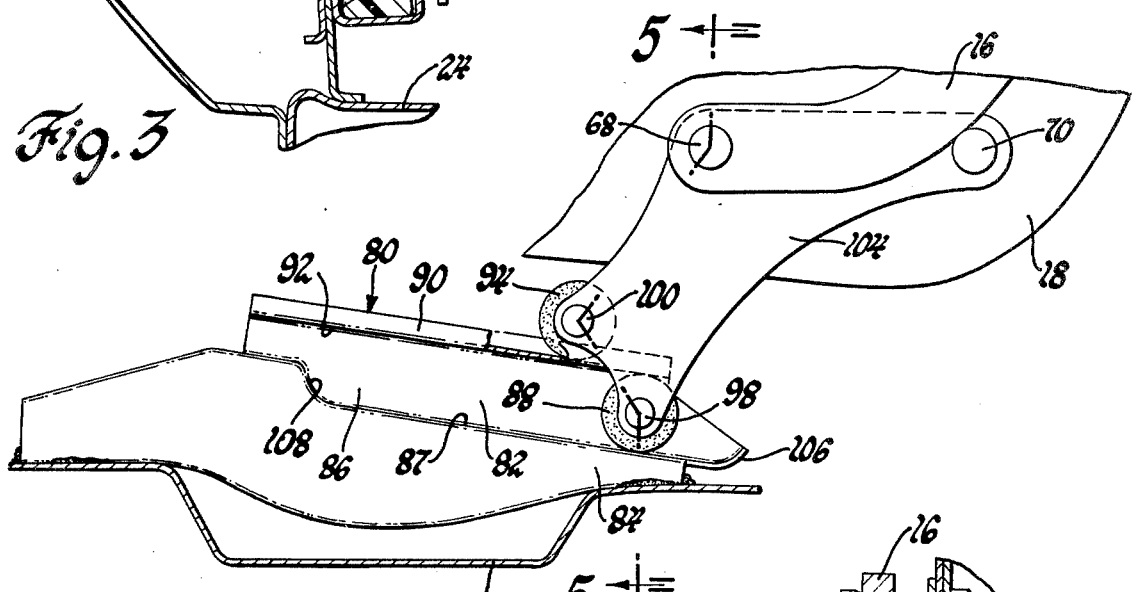
FIG. 4 is a view similar to FIG. 2 but showing a second embodiment of the invention.
Figure 5:
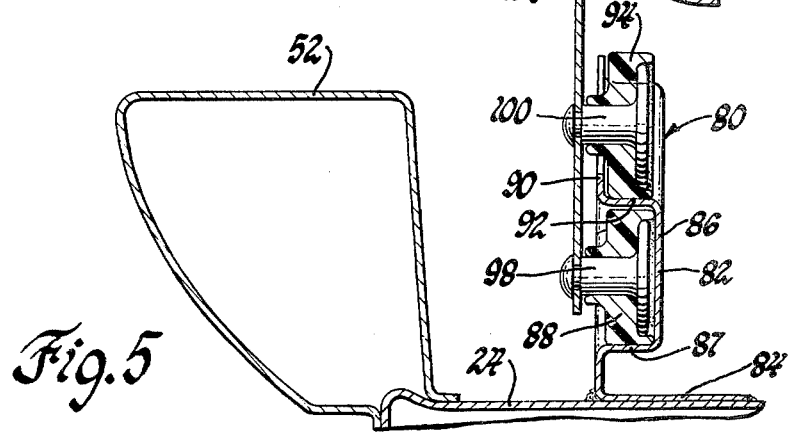
FIG. 5 is a sectional view taken in the direction of arrows 5—5 of FIG. 4.

A second embodiment of the invention is shown in FIGS. 4 and 5 wherein like elements are designated by the same numerals as in the embodiment of FIGS. 1, 2 and 3. Referring to FIGS. 4 and 5, it is seen that an outboard track assembly generally indicated at 80 includes a stamped steel track member 82 having a lower leg 84 which is welded to the floor pan 24, generally adjacent the body sill 52. Track member 82 has a channel configuration 86 which opens toward the body sill 52 and has a lower lateral leg 87 which supports a lower roller 88. The track member 82 also has a lip 90 which extends upwardly from an upper lateral leg 92 of the channel 86 and cooperates with the lateral leg 92 to support an upper roller 94. Rivets 98 and 100 respectively pivotally mount the lower roller 88 and upper roller 94 on the L-shaped mounting arm 104. The mounting arm 104 is shaped similar to the mounting arm 62 of the first embodiment and is similarly connected to the seat bottom frame 66 by nut and bolt assemblies 68 and 70 described hereinbefore with reference to the first embodiment of the invention.

Referring to FIG. 4, it is seen that the upper roller 94 is mounted slightly forward of the lower roller 88. The channel 86 of the track member 80 is beveled at its rearward end to facilitate assembly of the seat to the vehicle body by permitting the lower roller 88 to be lowered and onto the lower lateral leg 87 of channel 86 while the upper roller 94 is lowered onto the upper lateral leg 92. The lateral leg 87 is curved upwardly at its rearward end 106 and at its forward end 108 to limit forward and rearward rolling movement of the lower roller 88.

It will be understood that the second embodiment of FIGS. 4 and 5 has the same advantages of the first embodiment insofar as cantilevering the seat bottom rearwardly from the track 80 to minimize obstruction of rear seat foot space. However, as seen in FIG. 4, the location of the upper roller 94 somewhat forwardly of the lower roller 88 supports the outboard seat bottom frame at substantially a single point and yet may provide some resistance to forwrd pitching movement of the seat as well as promote adjusting movement by dividing the load between the two rollers 88 and 94.

Thus, it is seen that the invention provides an inboard fore and aft adjusting track member which supports the inboard side of the seat at at least two longitudinally spaced points against forward and rearward pitching movement and supports the outboard side of the seat at a single point. The outboard cushion frame is cantilevered rearwardly of the outboard mounting point to facilitate rear seat passenger entry by minimizing obstruction of the door opening and to maximize rear seat passenger foot space beneath the outboard side of the seat bottom frame.

The embodiments of the invention in which an exclusive property or privilege is claimed are defined as follows:

1. A seat adapted for mounting in a motor vehicle body for seating an occupant therein and comprising:
   a seat bottom frame having an outboard side and an inboard side;
   a longitudinally extending track assembly adjacent to and connecting for fore and aft longitudinal adjusting movement and providing support of the seat bottom frame at at least two longitudinally spaced points to provide the sole support of the seat bottom frame against forward and rearward pitching movement;
   a longitudinally extending track member mounted on the vehicle body adjacent the outboard side of the seat bottom frame; and
   track engaging means carried by the seat bottom frame and slidably interengaged with the track member at only one point to support the outboard side of the seat bottom frame for fore and aft adjusting movement, said outboard track member and track engaging means cooperating with the inboard track assembly to provide a stable tripodal support of the seat bottom frame on the vehicle body.

2. In a vehicle body seat comprising:
   a seat bottom frame having an outboard side located generally adjacent the vehicle body door opening, an inboard side located generally adjacent the vehicle body centerline, and a rearward portion facing the rear seat;
   a longitudinally extending track assembly adjacent to and connection the inboard side of the seat bottom frame to the vehicle body for fore and aft longitudinally adjusting movement and supporting the seat bottom frame at at least two longitudinally spaced points to provide the sole support of the seat bottom frame against forward and rearward pitching movement;
   a longitudinally extending track member mounted on the vehicle body adjacent the outboard side of the seat bottom frame; and
   track engaging means carried by the seat bottom frame and slidably interengaged in the track member to support the outboard side of the seat bottom frame for fore and aft adjusting movement, said track engaging means being located forwardly of the rearward portion of the seat bottom frame and cantilevering the outboard side of the seat bottom frame rearwardly therefrom in spaced relation above the vehicle body floor to maximize unobstructed rear seat passenger foot space beneath the outboard side of the seat bottom frame.

3. In a vehicle body having a first seat located adjacent a door opening and a rear seat accessible to the door opening by forward movement of the first seat, the combination comprising:
   a seat bottom frame for the first seat having an outboard side located generally adjacent the vehicle door opening, an inboard side located generally adjacent the vehicle body centerline, and a rearward portion facing the rear seat;
   a longitudinally extending track assembly adjacent to and connecting the inboard side of the seat bottom frame to the vehicle body for fore and aft longitudinally adjusting movement and supporting the seat bottom frame at at least two longitudinally spaced points to provide the sole support of the seat bottom frame against forward and rearward pitching movement;
   a longitudinally extending track member mounted on the vehicle body adjacent the outboard side of the seat bottom frame;
   a one-point track engaging means slidably interengaged in the track member for fore and aft sliding movement therein; and
   a seat support member having a lower end attached to the track engaging means and an upper end located above the track and attached to the side of the seat bottom frame and adapted to cantilever the rearward portion of the seat bottom frame rearwardly of the one-point track engaging means and the rearward most end of the track member when the seat is adjusted to the rearward position to minimize obstruction of the door opening and facilitate passenger entry to the rear seat and to minimize obstruction of rear seat passenger foot space beneath the outboard side of the seat bottom frame.

4. In a vehicle body having a first seat located adjacent a door opening and a rear seat accessible to the door opening by forward pivoting movement of the seat back of the first seat, the combination comprising:

a seat bottom frame for the first seat having an outboard side located generally adjacent the vehicle door opening, an inboard side located generally adjacent the vehicle body centerline, and a rearward portion facing the rear seat;

a longitudinally extending track assembly adjacent to and connecting the inboard side of the seat bottom frame to the vehicle body for fore and aft longitudinally adjusting movement and supporting the seat bottom frame at at least two longitudinally spaced point to provide the sole support of the seat bottom frame against forward and rearward pitching movement;

a longitudinally extending track member mounted on the vehicle body adjacent the outboard side of the seat bottom frame;

a one-point track engaging means slidably interengaged in the track member for fore and aft sliding movement therein;

a seat support member having a lower end attached to the track engaging means and an upper end located above the track, and forward and rearward fastener means attaching the upper end of the support member to the outboard side of the seat bottom frame to cantilever the rearward portion of the seat bottom frame rearwardly of the one-point track engaging means, said forward fastener means providing a pivot axis mounting the seat back for forward pivoting movement and said rearward fastener means providing a stop for engagement of the seat back to define the normal upright seat forming position of the seat back.

* * * * *

UNITED STATES PATENT AND TRADEMARK OFFICE
CERTIFICATE OF CORRECTION

PATENT NO. : 4,169,574
DATED : October 2, 1979
INVENTOR(S) : Louis P. Garvey, John G. Bobak, Robert A. Maye It is certified that error appears in the above-identified patent and that said Letters Patent are hereby corrected as shown below:

Column 3, line 65, after "connecting" insert -- the inboard side of the seat bottom frame to the vehicle body --.

Column 4, line 22, "connection" should read -- connecting --.

Signed and Sealed this

First Day of January 1980

[SEAL]

Attest:

SIDNEY A. DIAMOND

Attesting Officer

Commissioner of Patents and Trademarks